Patented Aug. 18, 1936

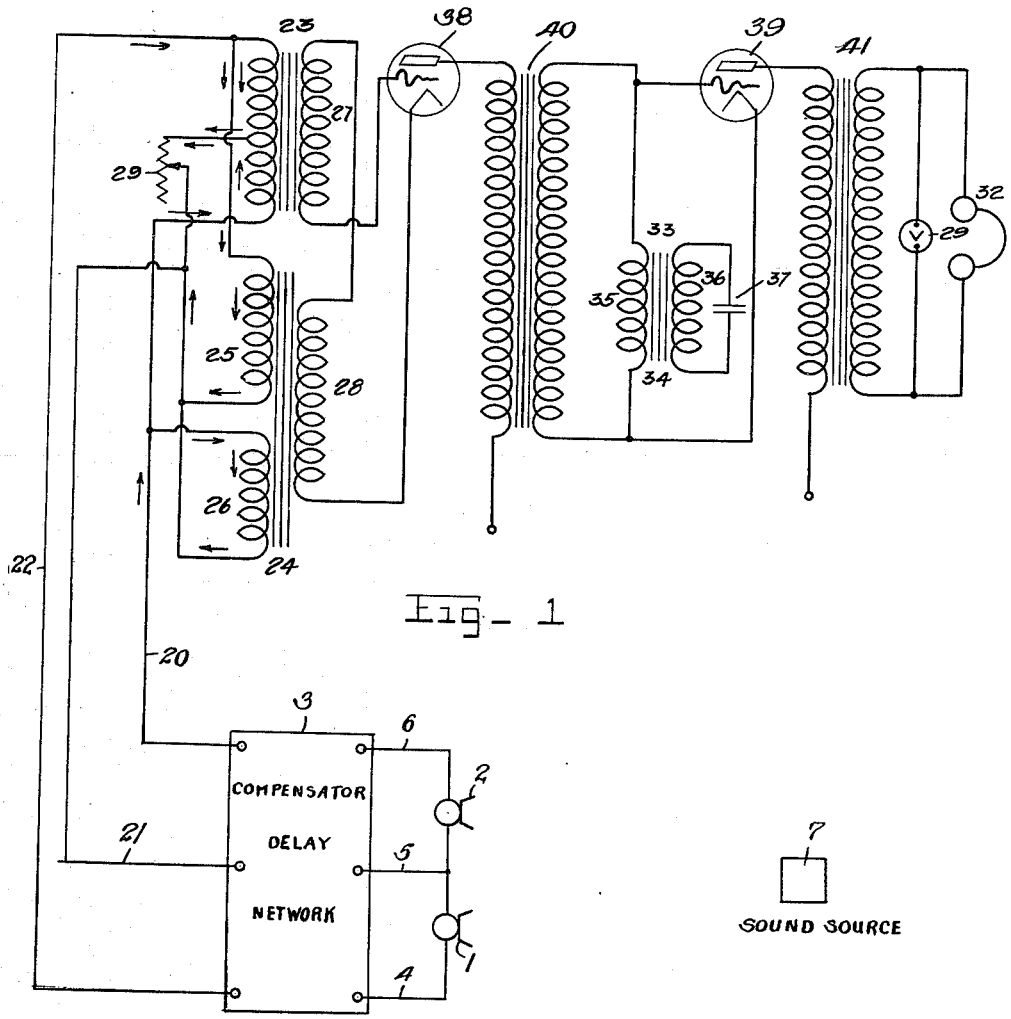

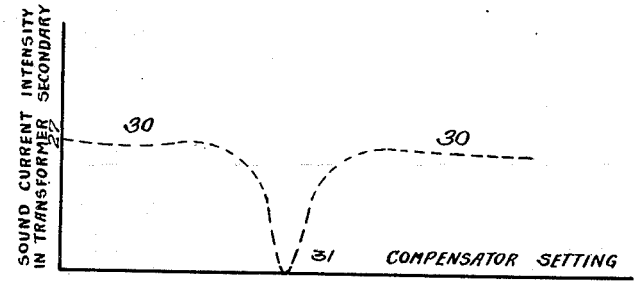
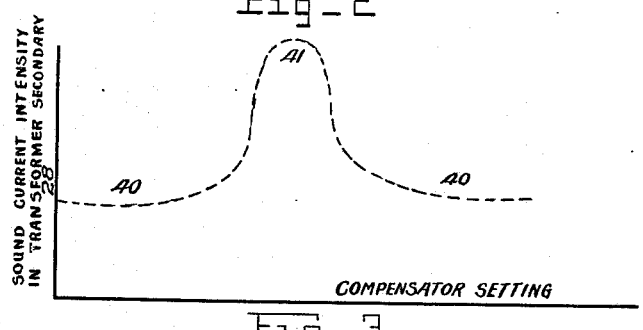
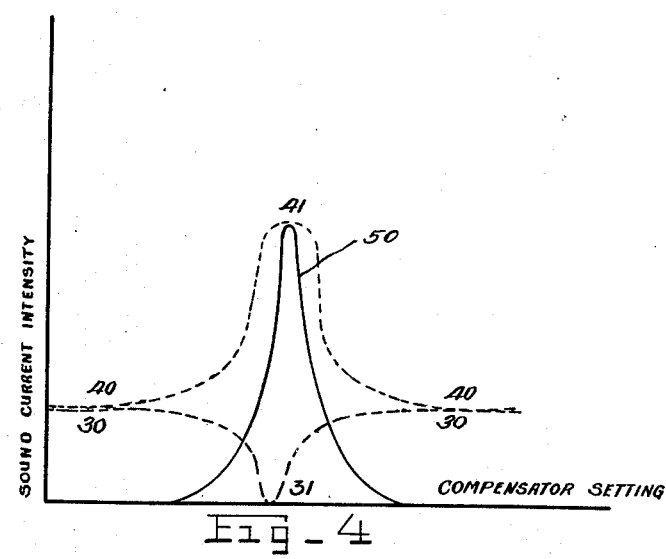

2,051,032

UNITED STATES PATENT OFFICE 2,051,032

SOUND RECEIVING APPARATUS

William C. Eddy, United States Navy

Original application July 28, 1932, Serial No. 625,501. Divided and this application August 22, 1934, Serial No. 740,957

6 Claims. (Cl. 177—386)

(Granted under the act of March 3, 1883, as amended April 30, 1928; 370 O. G. 757)

This invention relates to sound receiving apparatus, more particularly to an amplifier to be used in connection with an electric sound ranging compensator, and is a division of my application Serial No. 625,501 filed July 28, 1932.

The principal object of this invention is to provide a system wherein the direction of a source of sonic signals may be determined by combining the sonic signal controlled currents set up in a plurality of linearly displaced microphones or sound receivers in such a manner that the resultant combined current rises to a sharp maximum when the plurality of microphones or sound receivers are effectively focussed on the source of sonic signals.

A second object is to eliminate the necessity for the difficult training of binaural listeners by improving direction determination by a combined maximum and minimum indication.

A third object is to reduce the background of noise and to improve the sharpness of the maximum indication by the use of audio tuning that permits the use of the higher frequency components of the sound source.

A fourth object is to provide a visual means to indicate the proper adjustment of the compensator.

The apparatus of this invention is adapted primarily for use with an electric compensator such as shown in U. S. patent to Pierce No. 1,682,712. Briefly, it comprises twelve equally spaced microphones that, by groups of three microphones, are each connected to first retardation lines. The central microphone of each group is connected to a fixed retardation line, the other end of which is movably connected to the first retardation line, and the outside microphones of each group are connected to opposite ends of corresponding first retardation lines. By adjusting the movable connection of the fixed retardation lines to the first retardation lines, the electric currents caused by the sound from any direction striking each group of three microphones can be brought into phase at the corresponding movable connections. The movable connections of the forward two groups of microphones are connected to opposite ends of a second retardation line, and the movable connections of the after two groups of microphones are connected to opposite ends of another second retardation line. These second retardation lines have movable connections that may be adjusted so that the electric currents from the forward two groups of microphones and the electric current from the after two groups of microphones may respectively be brought into phase at their corresponding connections. The movable connections of the second retardation lines are respectively electrically connected to movable contact blocks associated with a third retardation line. These contact blocks divide the third retardation line electrically so that the output of the forward groups of twelve microphones is connected to one portion, and the output of the after group of twelve microphones is connected to the other portion of the third retardation line. The corresponding other ends of these portions of the third retardation line are respectively connected to the left and right telephone receivers. By adjusting these contact blocks, time retardation is introduced into the current through one of the telephone receivers in excess of the retardation in the current through the other receiver, so as to bring these currents into phase and to effect a proper binaural setting. The function of the third retardation line, when its two ends are separately connected to the two telephone receivers, is to bring the maximum sounds from the second retardation lines in the two receivers into phase so as to cause the physiological sense of the binaural centering of the sound. However, by connecting the two telephone receivers in multiple to the two ends of the third retardation line, it may be used to combine the currents so as to produce a maximum sound in each telephone receiver but without the binaural sensation. It may be noted that the same position of the contact blocks on the third retardation line that gives binaural centering also gives maximum when the two telephone receivers are connected in multiple to the two ends of the third retardation line.

In a device of this type the focusing ability varies with the frequency of the received sound. If the microphones of a 12-unit installation are spaced one foot between units, the intensity of a sound of a frequency of 300 cycle/sec falls to one-half its maximum value when it is 36 degrees out of focus; that of a sound of a frequency of 600 cycles/sec falls to one-half its maximum when it is 17 degrees out of focus; and that of a sound of a frequency of 1200 cycles/sec falls to one-half its maximum when it is 8.5 degrees out of focus. This improvement in focusing ability with increase of frequency is limited because of the fact that frequencies whose wave lengths in the medium are less than the distance between microphone units can not be employed in a device that depends on the adjustment of phase relation for operation. These high frequencies result in ambiguous readings because there is no way to be sure that all microphones are being compensated for the same wave front. Therefore, the electric compensator is usually designed to transmit all frequencies up to 4000 cycles/sec.

In the past it was believed that no advantage could be gained by amplifying the output from an electric compensator because the local disturbing noises were amplified in the same proportion as the sounds it was desired to hear. Also, in binaural operation it is best to keep distortion reduced as much as possible and it was impossible to build amplifiers for both ears that were exactly alike. Band pass, low pass and high pass filters have been used without much success.

The present invention is an efficient amplifier for use with an electric compensator that sharpens and improves the maximum response by combining with it the minimum so as to produce a combined signal that is sharply directive and readily recognized by the untrained listener. It can best be described and understood by reference to the accompanying drawings in which Fig. 1 shows a diagrammatic arrangement showing the output of the compensator being led into an amplifier whose input transformers are so connected that the maximum and minimum primaries are connected in parallel, and the secondaries, corresponding to said primaries, are differentially connected, the second stage of amplification being shown with audio tuning.

Figs. 2, 3 and 4 show graphically the curves of minimum and maximum amplifier response, singly and in combination, as will be hereinafter more fully explained.

In directional sound receivers of the binaural compensator type, the intensity of the sound received varies more sharply with a change of focus when the currents from the plurality of microphones are combined in such a manner as to give a minimum indication when the system is properly focused on a sound source than when the currents are combined to give a maximum indication when the system is properly focussed. It is thus seen that both the maximum and the minimum methods of combining the signal components of a binaurally centered sound pick-up system have definite advantages, the maximum method because of the strong signal available, and the minimum method because of the sharp directivity. In the present system, features of both the maximum and the minimum systems have been combined into a single system so that the sharply directive characteristics of a minimum system have been imparted to a system that is capable of supplying a maximum signal when the system is binaurally centered.

In Fig. 1, for the purpose of simplicity, only two microphones 1 and 2 are shown connected to the input terminals of the compensator 3. The microphones 1 and 2 correspond to the microphones 201 and 212 or the groups including microphones 201 and 212, respectively, of the Pierce Patent 1,682,712. Microphone 1 is connected by means of conductors 4 and 5 to the input terminals of one of the delay networks of the compensator 3, while microphone 2 is connected by means of conductors 5 and 6 to the input terminals of another and similar delay network of the compensator 3. The compensator 3 may, for example, be similar to that disclosed in Fig. 5 of the above mentioned Pierce patent in which case the input conductors 4, 5, and 6 connected to the compensator 3 correspond to conductors 761, 413, and 762, respectively, of the Pierce patent and the output leads of the compensator 3 numbered 20, 21, and 22 correspond to the leads 801, 805, and 802, respectively, of Pierce. Transformer 23 has a center tapped primary and is connected by way of conductors 20, 21 and 22 to the output terminals of the compensator 3 for operation on the minimum response, as shown by the arrows depicting the currents when the compensator is focussed on the sound source. The transformer 24 has two equal primary windings 25 and 26 that are differentially connected for operation on the maximum response, as also shown by arrows. Transformers 23 and 24 are connected, as shown, in parallel across the output leads 20, 21 and 22 of the compensator 3. The response curve for transformer 23 will be similar to that as depicted in Fig. 2, wherein the ordinates represent the intensity of the sound and the abscissae represent compensator positions or apparent positions, and the response curve for transformer 24 will be similar to that shown in Fig. 3, wherein the ordinates and abscissae are the same as in Fig. 2. Since the response as indicated by portions 30 is stronger than that indicated by portions 40 and in order to have them approximately neutralize each other, the strength of the response indicated by portions 30 must be reduced. This is accomplished by placing a variable resistance 29 in the common return lead 21 of transformer 23.

The secondaries 27 and 28 of the transformers 23 and 24 are differentially connected to the input electrodes of thermionic amplifier tube 38. The output circuit of the amplifier tube 38 includes the primary of the transformer 40. The secondary of the transformer 40 is connected to the input electrodes of a further thermionic tube amplifier 39. The primary 35 of the audio frequency transformer 34 is connected in shunt with a secondary of the transformer 40. The secondary 36 of the transformer 34 has a tuning condenser 37 connected thereacross, and the transformer 34 and condenser 37 constitute together an audio tuning arrangement 33 for tuning the input circuit of the thermionic amplifier 39. The output circuit of the amplifier 39 includes the primary of a transformer 41, the secondary of which is connected to the voltmeter or galvanometer 29 and also the head phones 32.

In operation the minimum 31 and the maximum 41 occur at the same setting of the compensator and they combine to give a response graphically illustrated by curve 50 in Fig. 4. Such combination does not affect the maximum response but makes the sides of the maximum peak steeper so that the peak of the response may be more readily determined and a more exact direct indication obtained.

When using the combined maximum and minimum response method with the amplifier of this invention, the output is of sufficient strength to permit the use of visual indicating means for determining the direction of the source of sound. This is shown by the voltmeter, or other indicating device, 29. It can be used alone or in conjunction with the telephone receivers 32 as shown. Indications as large as nine volts have been had with the apparatus of this invention.

In the operation of this invention it has been found desirable to select a frequency from the particular sound source which gives a good response and has the least interference from local or other sounds. This is accomplished by providing an audio tuning arrangement 33 which is connected across the secondary of the first interstage transformer and covers a frequency range approximately from 1,000 to 3,000 cycles/sec. The transformer 34 is a shunt trap transformer whose primary 35 has a fairly low impedance and whose secondary 36 has a fairly high impedance, but of such value that with a suitable condenser 37 it can be tuned over the frequency range desired. This effectively by-passes all frequencies except those for which the secondary 36 is tuned by condenser 37.

This invention has proved itself of immense value in actual operation. It has increased the effective listening range of this type of sound receiver three-fold, has improved the accuracy and reliability of the bearings obtained and has simplified the taking of bearings of sound sources so that an untrained listener with very little instruction can obtain the best bearings the apparatus is capable of producing. It abandons the binaural effect which requires special training of persons that are naturally adapted to such work and employs the maximum response principle which is easily recognizable by even the unskilled.

While there has been described the preferred embodiment of my invention, it is desired that it be understood that various changes in construction, proportion and arrangement of parts may be made within the scope of the subjoined claims, without sacrificing any of the advantages of this invention.

The invention described herein may be manufactured and used by or for the Government of the United States of America for governmental purposes, without the payment of any royalties thereon.

I claim:

1. In combination with an electric sound ranging compensator of the binaural output type, a vacuum tube amplifier including a first transformer having a unidirectionally wound center-tapped primary connected to the binaural output terminals of said compensator, a second transformer having two approximately equal primary windings differentially connected to said terminals in parallel with the primary of said first transformer, approximately equal secondary windings on each of said transformers, said secondaries being connected together differentially and feeding into a tuned audio frequency amplifier.

2. In combination with an electric compensator of the binaural output type, an amplifier comprising a first transformer having a center-tapped primary winding the two halves of which are additionally connected, a second transformer having two approximately equal primary windings that are differentially connected, the primary windings of said second transformer being electrically connected in parallel with the primary of said first transformer to the output of said compensator, the secondaries of said first and second transformers being differentially connected, means for adjusting the value of the input current to said first transformer, and at least one stage of tuned audio amplification the input circuit of which is connected to be energized by the secondaries of said transformers and the output circuit of which is connected to control at least one signal indicating means.

3. In a directional sound receiving system of the type wherein a portion of the output current of each of a plurality of linearly disposed sound receivers is combined in such phase as to produce an alternating current of maximum intensity when said plurality of sound receivers are effectively focussed on a source of sound, the method of sharpening the directive characteristics of said system which comprises combining a portion of the output current of each of said linearly disposed sound receivers to produce an alternating current of minimum intensity when said sound receivers are effectively focussed on a source of sound, then combining said currents of maximum and minimum intensities in phase opposition and utilizing the resultant current to control a signaling means.

4. In combination with an electric compensator of the binaural output type, an amplifier comprising a first transformer having a unidirectionally wound center-tapped primary winding that is electrically connected to the output of said compensator, a second transformer having two approximately equal primary windings that are differentially connected to the output of said compensator, the secondaries of said first and second transformers being differentially connected; means for adjusting the value of the input current to said first transformer, and at least one stage of audio amplification connected to be energized by the secondaries of said transformers.

5. In combination with an electric compensator of the binaural output type, an amplifier comprising a first transformer having a unidirectionally wound center-tapped primary winding that is electrically connected to the output of said compensator, a second transformer having two approximately equal primary windings that are differentially connected to the output of said compensator, the secondaries of said first and second transformers being differentially connected; means for adjusting the value of the input current to said first transformer, and at least one stage of tuned audio amplification, said first and second transformers and the transformers of the amplification stage having flat frequency response curves over the range of frequencies to be used.

6. A vacuum tube amplifier for combining and amplifying the output of a compensator of the binaural output type comprising a first transformer having a unidirectionally wound center-tapped primary winding adapted to be connected to the output terminals of said compensator, a second transformer having two approximately equal primary windings differentially connected parallel with the primary winding of said first transformer, said first and said second transformer having approximately equal secondary windings, an amplifier having input and output circuits and means for differentially connecting said secondary windings in the input circuit of said amplifier.

WILLIAM C. EDDY.